June 29, 1954  P. H. BILLS ET AL  2,682,353
COMBINED PUMPING, METERING, AND AIR SEPARATING
UNIT FOR GASOLINE DISPENSING PUMPS
Filed July 2, 1952  3 Sheets-Sheet 1

INVENTORS
PHILIP H. BILLS,
ALFRED L. GRISE
BY *Chapin & Neal*
ATTORNEYS

Patented June 29, 1954

2,682,353

UNITED STATES PATENT OFFICE 2,682,353

COMBINED PUMPING, METERING, AND AIR SEPARATING UNIT FOR GASOLINE DISPENSING PUMPS

Philip H. Bills, Longmeadow, and Alfred L. Grisé, Springfield, Mass., assignors to Gilbert & Barker Manufacturing Company, West Springfield, Mass., a corporation of Massachusetts Application July 2, 1952, Serial No. 296,884

20 Claims. (Cl. 222—23)

This invention relates to improvements in liquid measuring and dispensing apparatus, particularly of the class adapted for service station use in supplying automotive vehicles with liquid fuel.

The invention has for one object the provision of a single unit, containing the pumping, metering, and air-separating means, such unit being adapted for easy mounting in the housing of a gasoline dispensing apparatus and requiring connection only to the liquid-supply and liquid-delivery conduits and to a separator outlet conduit, which is used either to carry off air or an emulsion of liquid and air, whereby the individual mounting of the several named components and the pipe connections between the several components, as commonly used heretofore, are avoided.

The invention has for another object the provision, in apparatus of the class wherein a power-operated pump is adapted to force liquid through an air and liquid separator to a meter and also to drive a register which shows the amount of liquid dispensed, of a transmission for reciprocating the pistons of the meter from the pump, operable only when the pump is pumping liquid, such transmission including parts which are held in an operable driving engagement solely by liquid pressure derived from the pressure chamber of the separator after the same has been filled with liquid, and a clutch in the drive to the register, closing only by pressure of liquid delivered from the meter cylinders.

The invention also has for an object the provision in apparatus of the class described, of a casing having a plurality of pump cylinders radiating from a central chamber and a plurality of meter cylinders telescoped one in the outer end of each pump cylinder, an air and liquid separator superposed on this casing and having a pressure chamber connected to receive the discharge from the pump cylinders and to deliver air-free liquid to the meter cylinders only when the pressure chamber is filled with liquid under greater than atmospheric pressure, a piston in each pump cylinder reciprocated by driving means in the central chamber, a piston in each meter cylinder, and a one-way driving connection between each pump and meter cylinder enabling a pump piston to move a meter piston on a discharge stroke but not on a pressure stroke, whereby the meter pistons reciprocate only when liquid under pressure is received from the pressure chamber.

The invention also has for an object the provision of a driving means for the pump including a variable-speed transmission shiftable by hydraulic pressure, derived from the dispensing conduit, and adapted to progressively decrease the speed of the pump as the outlet of the dispensing conduit is increasingly throttled and to stop the pump when such outlet is closed.

The invention has for another object the provision, in apparatus of the class described, of air and liquid separating means located on the pressure side of the pump and interposed between the outlet of the pump and the inlet of the meter, the inlet of the meter communicating with the lower part of the primary or pressure chamber of the separating means under the control of a valve, which is held closed against any pressure due to the hydraulic head of liquid in such chamber and which opens to allow flow to the meter cylinders only when such chamber is filled with liquid under pressure greater than atmospheric.

Other objects of the invention, having to do with auxiliary and subsidiary features of construction, related to those above described, will appear from the following detailed description of one illustrative embodiment of the invention in the accompanying drawings, in which.

Figures 1, 6, 7, 8, 10:
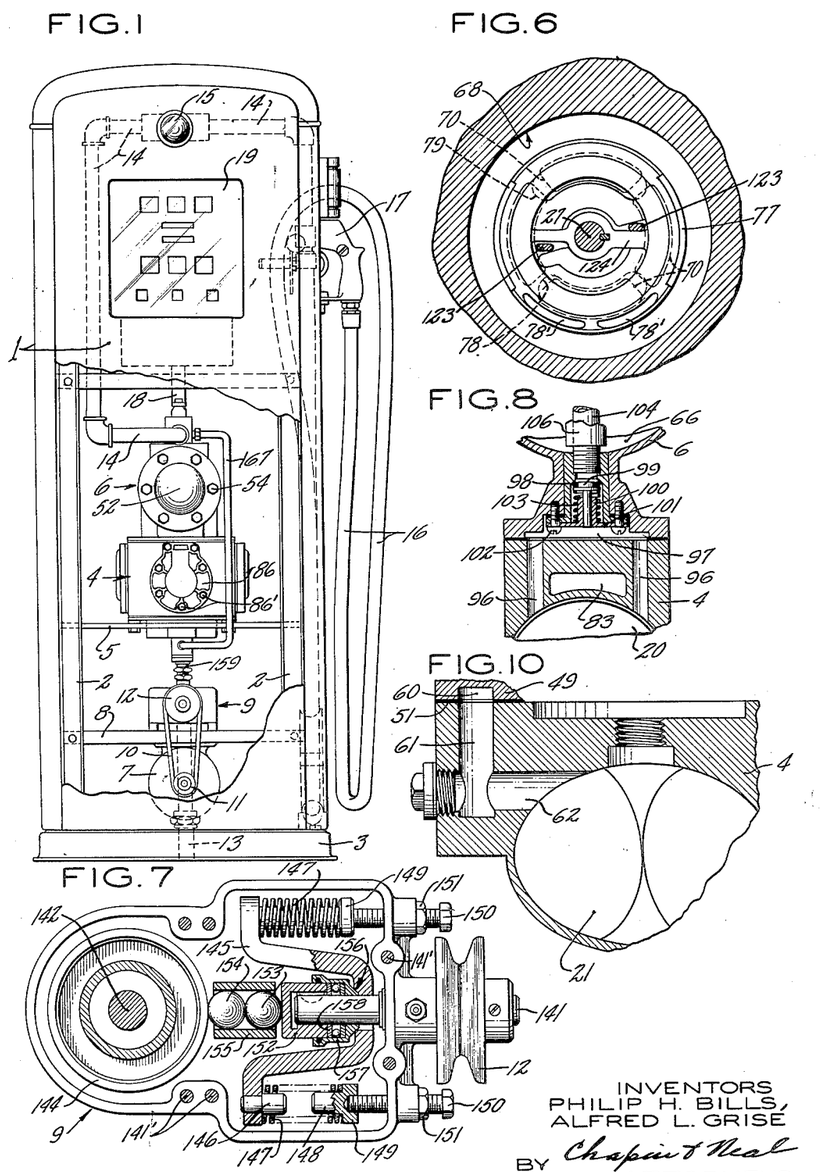
Fig. 1 is a small-scale front-elevational view of a gasoline measuring and dispensing apparatus embodying the invention, the housing of the apparatus being broken open to show the interior and particularly the unit apparatus of this invention.
Fig. 6 is a fragmentary sectional plan view taken on the line 6—6 of Fig. 2 and showing the distributing valve for the meter cylinders.
Fig. 7 is a sectional plan view taken on the line 7—7 of Fig. 2 and showing the variable-speed driving mechanism.
Fig. 8 is a fragmentary cross sectional view taken on the line 8—8 of Fig. 2.
Fig. 10 is a fragmentary sectional elevational view taken on the line 10—10 of Fig. 9.

Referring to these drawings; Fig. 1 shows the relationship of the apparatus of this invention to a measuring and dispensing apparatus for gasoline and the like. The dispensing apparatus includes a suitable housing 1, which has been partly broken away to reveal the apparatus of this invention. Inside the housing is a supporting framework, usually including a plurality of columns 2, upstanding from a base 3. The apparatus of this invention includes pumping and metering means, both located within a casing section 4, which is supported from a table 5 suitably fixed to columns 2; air and liquid separating means, contained in a casing section 6, superposed on and fixed to section 4; an electric motor 7, supported from the lower side of a table 8, suitably fixed to columns 2; a variable-speed driving mechanism contained in a casing 9, which is mounted on top of table 8 and is driven from the motor 7 by the belt 10 and pulleys 11 and 12 and which drives, in a manner to be later described, the pumping and metering means. The pumping means draws gasoline through a suction pipe, shown in part at 13, from a low level supply tank (not shown) and forces it successively through the separating means and metering means and thence through a discharge conduit, which includes rigid pipe sections 14, an interposed flow indicator 15, and a flexible hose 16, terminating with the usual manually-controlled valved nozzle 17. The pumping and metering apparatus drives through a shaft 18 a suitable register 19 which shows the quantity and/or cost of the gasoline dispensed.

Figure 2:
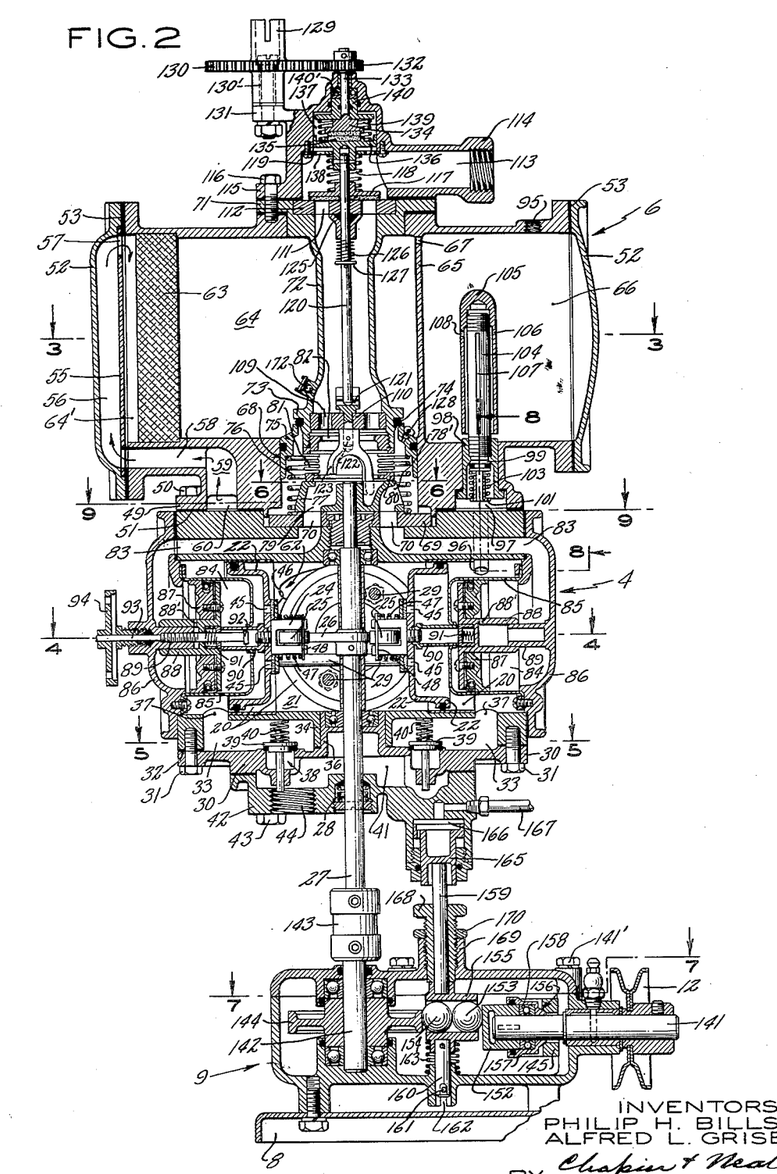
Fig. 2 is a sectional elevational view on a larger scale, showing the apparatus of this invention.
Figure 4:
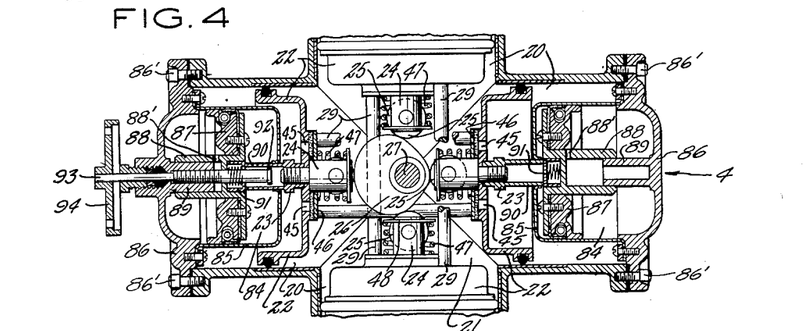
Fig. 4 is a sectional plan view taken on the line 4—4 of Fig. 2, and showing the pumping and metering means and the driving means therefor.

The pumping means will next be described with reference to Figs. 2 and 4. Fig. 2 shows all the apparatus contained in the several casing sections 4, 6 and 9, while Fig. 4 shows merely the pumping and metering means but on a larger scale than Fig. 2. The pumping means includes a plurality (four as shown) of horizontally-disposed cylinders 20, which radiate from a central chamber 21, both formed within the casing section 4. In Fig. 4 all four of these cylinders are indicated although two of them have been broken away in part. Slidable in each pump cylinder 20 is a valved piston 22, herein shown as cup-shaped and as having suitable packing in its annular rim portion to provide a leak-proof sliding engagement with the peripheral wall of its cylinder. Centrally fixed to the inner face of the end wall of each piston 22, as by a nut 23 is a cylindrical part 24, which is diametrically slotted to receive a roll 25. As best shown in Fig. 4, the several rolls 25 ride on the periphery of a driving cam 26, which is located in the central chamber 21 and is fixed to a vertical shaft 27. This shaft (Fig. 2) is mounted in suitable ball bearings provided in the upper and lower walls of chamber 21 and extends out of the casing through a suitable stuffing box 28 for connection to a variable-speed driving mechanism, to be later described. Each pair of oppositely-disposed pistons 22 are rigidly interconnected by a pair of tie rods 29. These rods are staggered, as indicated, so as to lie in non-interfering relation.

Figure 5:
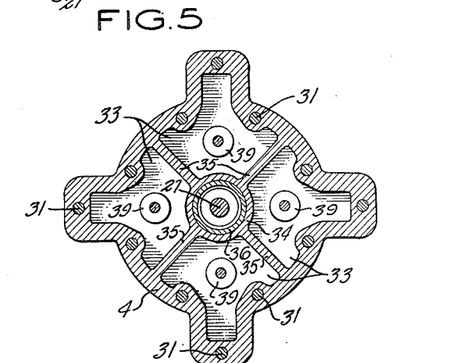
Fig. 5 is a sectional plan view taken on the line 5—5 of Fig. 2 and showing the inlet passages and inlet valves for the pump cylinders.

The inlet valves for the several pump cylinders are carried by a plate 30, clamped by cap screws 31 to the lower face of casing 4 with a gasket 32 interposed therebetween. The lower part of casing 4 is recessed to provide four inlet chambers 33. The construction is best shown in Fig. 5, from which it will be seen that a central hollow hub 34 has four partition walls 35, radiating therefrom to the outer marginal wall, forming the four inlet chambers 33. The lower end faces of the hub and the partition walls 33 (Fig. 2) all lie in the same horizontal plane and are clamped against the gasket 32. The plate 30 has a central upstanding hub 36 which telescopes into hub 34 and the upper end of which carries the lower ball bearing for shaft 27. The outer end of each chamber 33 is connected by an opening 37 in its upper wall to the outer end of the overlying pump cylinder 20. Each inlet chamber 33 has an inlet opening 38 which is formed in plate 30 and the upper end of which affords a seat for a poppet valve 39, slidably mounted as indicated and yieldably held to its seat by a spring 40. Underlying all these valves and communicating with all the inlet openings 38, is a chamber 41, formed within a lower cover 42, which is fixed by cap screws, such as 43, to the plate 30. This cover 42 has an opening 44, leading into chamber 41 and adapted for connection to the described suction pipe 13. It will thus be clear that each piston 22, when moved inwardly in its cylinder 20 will draw liquid from pipe 13 through chamber 41, opening 38, the then open valve 39, chamber 33 and opening 37 into the cylinder 20.

Each piston 22 has a plurality of holes 45, extending through its end wall. Slidably guided on the cylindrical member 24 is an outlet valve 46, which is pressed by a spring 47 against the outer face of such end wall to close all of the openings 45, the spring abutment consisting of a snap disk 48 mounted in a groove in the member 24. It will be seen that on the outward stroke of each piston 22, the liquid drawn into the cylinder 20 during the previous stroke, will be expelled through holes 45 and valve 46 into the central outlet chamber 21.

Figure 3:
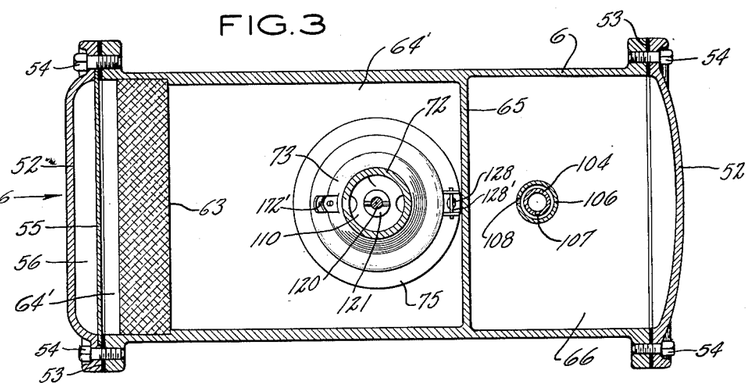
Fig. 3 is a sectional plan view taken on the line 3—3 of Fig. 2 and showing the air and liquid separating means and the recovery-means for separated liquid.
Figure 9:
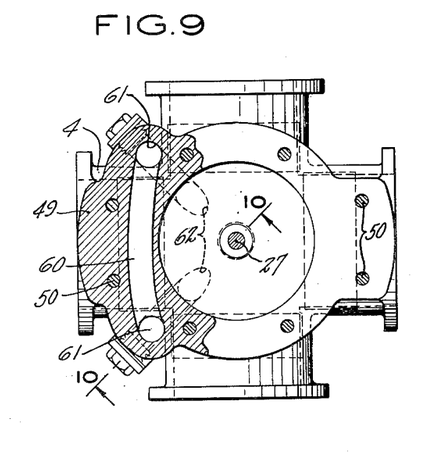
Fig. 9 is a fragmentary sectional plan view taken on the line 9—9 of Fig. 2.

The air and liquid separating means will now be described with reference to Figs. 2 and 3. Fluid from the outlet chamber 21 is discharged into the air and liquid separating means, that is contained in the casing 6. The latter has a base flange 49 that rests on the top of the casing 4 and is suitably secured thereto as by screws, such as 50, and an interposed gasket 51. The casing 6 is in the form of a cylinder closed at opposite ends by heads 52, each of which is clamped to an end of the casing with an interposed gasket 53 by screws 54. Clamped between the left hand head 52 and its gasket 53 is a thin metal plate 55, which partitions the space 56 within the head from the rest of the cylinder except for an opening 57 above the weir-forming upper edge of the plate. The lower part of this space 56 is connected by a horizontal passage 58, which extends through plate 55 and the lower part of casing 6, to the upper end of a vertical passage 59, the outer end of which connects with the mid point of an arcuate passage 60, formed in the base flange 49. Each end of this passage 60 is connected, as shown in Fig. 9, to the upper end of a vertical passage 61 formed in casing 4, and the lower end of each passage 61 is connected as shown in Fig. 10 by a horizontal passage 62, formed in casing 4, to the chamber 21.

The left hand end of the cylinder within the casing 6 (Figs. 2 and 3) is of slightly larger diameter than the rest in order to receive a short, cylindrical coalescing roll 63, and provide a shoulder against which the roll is held by pressure of the liquid. The cylindrical space within the casing 6 is divided by a partition 65 into two chambers 64 and 66. The chamber 64 is the pressure or primary chamber of the separator. The chamber 66 is the secondary or liquid recovery chamber of the separator and receives air or air and liquid mixed from the pressure chamber through a restricted orifice 67 formed in partition 65 near its upper end. Fluids flow into the separator over the dam 55 into an entrance portion 64' and then pass through roll 63 into pressure chamber 64. The dam 55 prevents the liquid in chamber 64 from draining back in case of leakage through the pump line.

The roll 63 is a crinkled wire-mesh coalescing roll. It is made up of a suitable length of fabric constructed of fine wire, preferably of non-corrosive metal, such as Monel metal. This metal is woven into a tubular fabric which is flattened down, forming a two-ply strip, which is then crimped and finally wound up into roll form. This roll is a standard article available in the market and can be procured in any diameters and widths desired. The roll presents a compact mass of interfitting and intertangled wires and provides a very large number of very small interstices. The passages through the roll are exceedingly fine and tortuous.

The roll 63 has the property of coalescing the air bubbles contained in the liquid. Very small bubbles are made into larger ones. The small bubbles are slow to rise in the liquid. However, if the small bubbles contained in the liquid in the chamber 64' are made to combine with others during their passage through the roll, the large bubbles emerging from the roll into chamber 64 will rise rapidly to the top of the liquid and be carried off with some liquid as an emulsion through restricted orifice 67 into the secondary separator or liquid recovery chamber 66, leaving substantially air-free liquid in the lower part of chamber 64.

The liquid metering means will next be described with reference to Figs. 2 and 4. Air-free liquid is taken from the bottom of the primary separating chamber 64 through a vertically-disposed cylindrical passage 68, located coaxially of shaft 27. At the lower end of this passage is a circular disk 69 which is fixed to the top wall of casing 4 and has four ports 70 therethrough, spaced 90° apart. Suspended from the top of casing 6 by an annular flange 71 and extending through the chamber 64 with its lower end entering the upper part of passage 68 is a tubular member 72, forming part of the discharge passage for the metering cylinders, as will later appear. This member 72 has near its lower end an outturned flange 73, and mounted on the lower part of member 72 and seated against the lower face of this flange is an O-ring 74 of suitable rubber-like material. A tubular valve 75, having a leak-tight sliding engagement with the peripheral wall of passage 68, is pressed upwardly by a coil spring 76, which acts between disk 69 and the valve, into engagement with ring 74 to close the annular outlet from the separator chamber 64 that is formed between the member 72 and the wall of passage 68. The spring 76 has sufficient force to hold valve 75 closed under the pressure due to any head of liquid in the chamber 64. It is intended to open only after the separator chamber 64 is filled with liquid and such liquid has been placed under pressure above atmospheric by the pumping means described.

The upper face of the described disk 69 is formed with a seat for a rotary valve 77 which is slidably keyed to shaft 27. This valve (Fig. 6) has in its base an inlet port 78, which continually communicates with inlet passage 68 by passages 78' in its outer periphery and which is adapted to successively communicate with the ports 70. Valve 77 also has in its lower portion an outlet port 79, which is adapted to successively communicate with the ports 70 and which extends upwardly, expanding into a passage which extends through the top of the valve. Engaging the annular top face of valve 77 (Fig. 2) is an annular seal ring 80, connected to the lower end of a bellows 81, the upper end of which is connected to an annular nut 82 threaded into the lower end of tubular member 72. The bellows 81 provides a leak-tight connection between the discharge passage 79 in the rotary valve and the discharge passage formed within the member 72.

The several ports 70 described are connected by passages 83 in the upper part of casing 4, one to each of the four meter cylinders 84. Each meter cylinder is smaller in diameter than the adjacent pumping cylinder 29 and is partially telescoped in the latter. Each meter cylinder is formed within a cup-shaped member 85 having an out-turned flange, fixed as indicated to the inner face of a head 86, which is secured by screws 86' to casing 4 and closes the outer end of a pump cylinder 20. Each passage 83 extends through a head 86 to connect with its meter cylinder 84. Slidable in leak-tight engagement with the peripheral wall of each cylinder 84 is a piston 87, which has a hollow hub 88 guided on a hollow stud 89, projecting inwardly from head 86. The hub 88 has a vent hole 88' leading radially outward from the inner end of its hollow interior. The inner end of member 85 has a central opening therethrough to slidably receive a tubular extension 90 of the above-described nut 23 on the pump piston 22. This member 90 is a push rod which is adapted to abut the inner face of the meter piston 87 and move it outwardly. Actually, the sleeve 90 abuts a spring-pressed cup-shaped plunger 91, mounted in the central part of the piston. This plunger is desirable in that it affords a shock-absorbing action during the operation of priming the apparatus but it is not otherwise essential because, during normal operating conditions, the spring of this plunger will be compressed until the plunger abuts the bottom of its socket. Each pump piston 22, on the discharge stroke thereof, moves the meter piston 87 positively on its discharge stroke. The suction stroke of the meter piston is effected solely by pressure of the pumped liquid. If liquid under adequate pressure is not available each meter piston 87 will remain at the outer end of its stroke once it has been moved there. Normally, however, the meter piston 87 will move inwardly with the pump piston 22 and will be limited on its inward stroke thereby.

One of the four meter cylinders, that shown at the left in Fig. 2, is equipped with an adjustable means for limiting the intake stroke of its piston 87 to less than that permitted by the pump piston. Such means consists of a flange 92 on the inner end of a rod 93 which extends through the tubular member 90, the piston 87, and plunger 91, and has a screw threaded portion engaged with the interiorly threaded portion of the left hand hollow stud 89. The rod extends outside the meter cylinder 84 through a suitable stuffing box in its head 86, as indicated, and is provided outside the meter cylinder with the usual hand wheel 94 whereby the rod may be conveniently turned to move flange 92 to various positions of adjustment for calibration purposes. It will be clear that this piston 87 may abut this flange and come to rest before the sleeve 90 carried by the pump piston 22 comes to rest, to thereby shorten the stroke of this particular piston, when required.

On the outward or discharge stroke of each metering piston 87, the hub 88 on the piston telescopes the hollow guide stud 89 and the liquid, which fills the space within these parts, has to be expressed through the vent hole 88' into the metering cylinder 84. These telescoping parts act as a dash pot, resisting outward movement of the piston 87 and holding the latter against its driving member 90. In particular, this dash pot arrangement prevents the meter piston from being carried beyond the intended limit of its outward stroke, as by momentum due to its high speed, and acts to maintain the meter piston in contact with its cam-driven actuating part 90.

The driving member 90 for each meter piston has a sliding fit in a central opening of the inner end wall of the meter cylinder 84. The clearance between a member 90 and the hole, through which it slides, enables fluid to pass back and forth from the space between the inner face of a meter piston and the inner end wall of its cylinder into and out of the adjacent pump cylinder 20. Fluid is therefore not trapped in such space. Conceivably, the clearance space in each meter cylinder (that volume between its inner end wall and the meter piston when the latter is at the inner end of its stroke) may eventually fill with liquid. As the meter piston 87 moves outwardly, a small quantity of liquid will be drawn into the space referred to, the rate of inflow depending on the clearance area around member 90 and the pressure of the liquid but liquid will be returned to pump cylinder at substantially the same rate on the inward stroke of the meter piston, so that liquid does not accumulate in a meter cylinder between its piston and the inner end of the cylinder to an extent such as to prevent contact between such piston and the member 90 which drives it outwardly.

The liquid recovery means will next be described with reference to Figs. 2, 3 and 8. The secondary chamber 66 of the separator is used to separate the air from the liquid contained in the emulsion received through the restricted orifice 67 and allow the separated air to be carried off to the atmosphere and the separated liquid to be returned to the pump. The same work can be accomplished in the low-level supply tank and sometimes the emulsion forced out of the orifice 67 is conducted by a pipe to the upper part of this tank. Thus, the secondary chamber is not always necessary although it is desirable because it eliminates the necessity of running an extra pipe back to the supply tank. In either case, the final separation of air and liquid is effected by gravity under atmospheric pressure and the separated air is carried off by a vent pipe which may be connected to the outlet 95 of chamber 66 as shown or which may be the usual vent pipe of the supply tank.

The invention provides a novel means for returning the separated liquid that accumulates in chamber 66 to the pumping means. One of the pump cylinders and its piston is utilized in part for drawing liquid from chamber 66. In this case the pump cylinder 20 shown at the right in Fig. 2, is connected by two vertical passages 96, which are formed in casing 4 and located one on each side of meter passage 83, as shown in Fig. 8, to a chamber 97, formed in the base of casing 6. Mounted in a hole that leads vertically from chamber 97 into chamber 66 is a hollow sleeve 98, having a flanged lower end, which is seated against the upper wall of chamber 97 and has a seat intermediate its ends for a poppet valve 99. The stem of the latter is slidably mounted in a hub 100, having two diametrically-opposed ears 101, which seat on the flanged lower end of sleeve 98 and are held with the latter by screws 102 threaded into casing 6. A coil spring 103, encompassing hub 100, acts between the ears 101 and the lower face of valve 99 to hold the latter to its seat. Threaded in the upper end of the sleeve 98 is stand pipe 104 which extends upwardly into the separator chamber 66. A cap 105 closes the upper end of pipe 104 and from this cap an integral sleeve 106 extends downwardly in spaced, coaxial relation with the pipe to a location close to the bottom of the separator chamber 66. A single, narrow, vertical slot 107 is formed in pipe 104, extending from the level of the bottom of sleeve 106 upwardly to a level near the cap 105. A small siphon-breaking aperture 108 is formed in sleeve 106 just above the last-named level. The described arrangement enables one of the four pump pistons 22 to draw some liquid into its cylinder 20 from chamber 66, on each suction stroke when the valve 99 opens. On the discharge stroke of this piston, valve 99 will close. While this valve is closed, the chamber 66 will be under atmospheric pressure and separation of air and liquid can occur by gravity. The separated air will leave the chamber 66 through the vent 95. The slot 107 in the standpipe 104 provides a rectangular outlet of variable effective area through which outlet liquid can enter the pipe, the effective area varying with the level of liquid in the chamber. The rate at which liquid will be pumped out of chamber 66 accordingly will vary with the need, the object being to balance the output of liquid from chamber 66 with the input of liquid thereto.

The discharge conduit with its valve provisions will next be described with reference to Fig. 2. The liquid discharged from the metering cylinders 84 through the passages 83, ports 70 and the passage 79 through rotary valve 77, flows through holes 109 in a lower circular disk 110, fixed in tube 72, into the latter and upwardly therethrough, discharging through holes 111 in an upper disk 112, fixed in tube 72, into an outlet passage 113. This passage is adapted for connection to the above described dispensing conduit 14. The passage 113 is formed in a member 114 having a flange 115 which together with above described flange 71 and the intervening gaskets indicated, is secured by screws 116 to the casing 6. The outflow of liquid into the outlet passage 113 is controlled by a check valve 117 which seats on the upper face of disk 112 to close off the holes 111 and which is yieldingly held to its seat by a spring 118, seating against a disk 119, fixed as indicated to the upper wall of passage 113. This spring 118 will allow the check valve to open under very small pressure, say for example 2 or 3 p. s. i. A drive shaft 120 extends through the hub of check valve 117, has a bearing in the upper disk 112 and extends downwardly through tube 72 to connect by a coupling 121 with a short shaft 122. This shaft has a bearing in the lower disk 110 and its lower end is fixed to a fork 123, which is adapted to be driven by the rotary valve 77 by the abutment of its webs 124 with the tines of the fork.

Slidable on shaft 120 below the upper disk 112 is a valve 125, which is pressed upwardly against the central portion of the lower face of disk 112 by a spring 126, encompassing shaft 120 and acting against an abutment 127 on this shaft to move the valve upwardly and hold it with considerable force against disk 112. This valve 125, as will be seen, does not cover the holes 111. It merely prevents back flow of liquid between shaft 120 and disk 112. It is an expansion relief valve. When the valve in the dispensing nozzle 17 is closed, liquid is trapped in the dispensing conduit between the nozzle valve and the check valve 117. Should expansion occur, some liquid can escape between the disk 112 and shaft 120, opening valve 125 and escaping into the passage within tube 72 from which it can escape by way of a small vent passage, formed through a hub on the wall of tube 72, into the vented chamber 64. This vent passage is normally closed by a ball valve 172 located in the hub passage and held against a seat in such passage by pressure of the liquid in chamber 64, the pressure in this chamber during operation always being greater than that in tube 72. A small cross pin 172' (Fig. 3) spanning ears on the hub, overlies the valve 172 and prevents it from moving out of the passage when it opens. The valve spring 126 (Fig. 2) should be strong enough to hold the valve 125 closed at least throughout the range of dispensing pressures which may, for example, reach a maximum of from 15 to 17 p. s. i. Often this valve is made to open at around 40 p. s. i.

The inlet passage 68 also has a relief passage into chamber 64. As shown, this passage is formed in outlet valve 75 and is normally closed by a ball valve 128. This valve is held closed by the pressure of liquid in the separator chamber 64. When this valve opens, it is prevented from movement out of its socket by means of an overlying pin 128' (Fig. 3) fixed at its ends in a pair of spaced lugs on the exterior of tube 72.

The register driving means will next be described with reference to Fig. 2. The register 19 is adapted to be driven from the rotary meter valve 77 through the described fork 123, shaft 122, coupling 121 and shaft 129 through the intermediary of a clutch, which is responsive to pressure in the outlet passage 113. The above described register shaft 18 is adapted for connection to the coupling 129, fixed to and upstanding from a gear 130, which is rotatably mounted on a stud 130', fixed to an arm 131, projecting from the member 114. Gear 130 meshes with a pinion 132, which is fixed to the upper end of a short vertical shaft 133. On the lower end of the latter is fixed a cork-faced clutch element 134, which is adapted to engage a similar clutch element 135. The element 135 is fixed to the upper face of a piston 136, which in turn is slidably keyed to the upper end of shaft 129. This piston is slidable and also rotatable in a cylinder 137, formed in member 114. Liquid from passage 113 can enter cylinder 137 through holes 138 in the described spring seat 119 and press the piston upwardly to engage the clutch elements 134 and 135, whereby the register may then be driven from shaft 129 and the described connections from the driving shaft 27. A spring 139 acting against the flange on the lower end of a sealing member 140 which encompasses shaft 133, tends to disengage the clutch elements. This spring should be such as to allow the clutch elements to engage even at very low operating pressures, say for example, as low as 2 or 3 p. s. i., and should disengage such elements only when the pump loses its prime. The upward thrust of the engaged clutch elements is transmitted through the member 140, the upper end of which engages an anti-friction thrust bearing 140' mounted in member 114 just below the sleeve bearing for shaft 133. The member 140 has suitable packing therein to seal the joint between it and shaft 133 and between it and the wall of the recess in which it is mounted.

The variable-speed driving mechanism will next be described with reference to Figs. 2 and 7. It will be clear that the pump and meter pistons should not be in operation, when the outlet of the dispensing conduit is closed, as by the usual valve in nozzle 17. Therefore, the variable-speed mechanism in casing 9, above referred to, is interposed between the power source 7 and the described driving shaft 27. This mechanism includes a driving shaft 141, to which the above described pulley 12 is fixed and which is mounted with its axis horizontal in a bearing in a hollow casing 9. This casing is conveniently made in two sections held together by screws 141'. The driven shaft 142 is mounted, with its axis vertically disposed, in ball bearings provided in the upper and lower sections of the casing 9. The upper end of shaft 142 extends outside and above the upper section of casing 9 and is connected by a flexible coupling 143 to shaft 27. Fixed to shaft 142 within the casing 9 is a driven disk 144, having an outer peripheral surface, which is truly cylindrical. Loosely encompassing the driving shaft 141 (Fig. 7) is the central cross bar portion of a U-shaped yoke 145 having outturned ends in which are fixed studs 146. Coil springs 147 are provided one on each side of yoke 145 to press its outturned ends toward the driven member 144 in directions parallel to the axis of driving shaft 141. Each such spring has one end telescoped over a stud 146 and seated against one out-turned end of yoke 145, and its other end telescoped over a stud 148 and seated against a head 149 on this stud. Screws 150, threaded into an end wall of casing 9 and held in position by lock nuts 151, have their inner ends engaged with the heads 149 to compress the springs between these heads and the out-turned parts of yoke 145. Slidably keyed to the driving shaft 141 is a tubular element 152 having a closed outer end, which affords a flat circular driving face. Interposed between this driving face and the outer cylindrical surface of the driven member 144 are two hardened steel balls 153 and 154, located in a cylindrical passage of a carrier 155. The ball 153 is pressed by driving member 152 against ball 154 and the latter is pressed against the outer periphery of driven member 144 by means of the springs 147 and yoke 145. The hole in the center of the yoke receives the conical outer end 156 of a cup-shaped member 157 in which is a ball thrust bearing 158. The driving member 152 is partially telescoped in member 157. Thus the springs 147 force yoke 145 against cup 157 and press the bearing 158 against the driving member 152 and the latter against the balls 153 and 154 and driven member 144. The ball carrier 155 has fixed one to each of two opposite sides upper and lower guide rods 159 and 160, which are slidably mounted in the upper and lower sections of casing 9 respectively. To prevent the carrier from turning, the lower rod 160 has fixed therein a pin 161, which extends diametrically through its lower end and has outwardly projecting ends, engaged in a vertical slot 162 formed in the hub of casing 9 that slidably supports this rod. A spring 163, coiled around rod 160 acts between the lower section of casing 9 and the lower wall of carrier 155 with a tendency to move the carrier upwardly and hold it in the position shown, which is that for the maximum driving rate. The carrier is moved downwardly by hydraulic pressure. The upper end of the upper guide rod 159 is adapted to engage in a socket in the lower end of a piston 165, which is slidably mounted in a leak-tight manner in a cylinder 166, formed in the lower cover member 42 of casing 4. The upper end of this cylinder is suitably connected, as by a conduit 167 indicated in Fig. 1, to the discharge passage 113. The spring 163 has sufficient force to hold the carrier 155 in the illustrated position against the force of any normal operating pressure of the liquid exerted on piston 165. That is, pressures, such as 17 or 18 p. s. i. in passage 113, will not move the carrier. However, if the valve in nozzle 17 is partially closed, the pressure will rise in passage 113 and cylinder 166 and force the piston 165 downwardly to shift the carrier 155 and decrease the rate at which the pump is driven. Increasing restriction in the nozzle 17 will cause decreasing speeds of the pump. Finally, closure of the nozzle valve will stop the drive of the pump by shifting carrier 155 until the center of ball 153 lies in a continuation of the axis of shaft 141. In maximum speed position, the upper end of the upper hub of carrier 155 abuts the lower end of a tubular stop screw 168, which encompasses rod 159 and is threaded into a hub 169 on the upper section of casing 9. This stop is therefore adjustable to vary the maximum speed at which the pump and meter operate. In the present example, such speed is around 240 R. P. M. A lock nut 170, threaded on stop screw 168 is adapted to engage the upper end of hub 169 and hold the stop screw in its various positions of adjustment.

The operation of the apparatus will next be described. Initially, all the described pipes, passages, chambers and cylinders are filled with air. To scavenge this air from the system, the pumping means is operated while the valve in hose nozzle 17 is held open. The motor 7 is started, and since the variable-speed transmission will then be in full-speed position, the shaft 27 will be driven to rotate cam 26 and reciprocate the pump pistons 22. The reciprocation of these pistons will cause air to be drawn from the suction pipe and successively into the pump cylinders and subsequently discharged through the outlet valves 46 into the central chamber 21 and thence by way of passages 62, 61, 60, 59, 58, and 56, over the top of dam 55 through passage 57 into the entrance chamber 64', and through the coalescing roll 63 into pressure chamber 64. The separator outlet valve 75 will then be held closed by its spring 76 so that the only outlet from this chamber then available is the restricted orifice 67. This is very small in cross sectional area as compared to the separator inlet 57 and outlet 68 and the various other liquid-conducting pipes and passages described. In the present example, this orifice is about one-eighth inch in diameter. This very small orifice will rapidly pass all the air that the pump can pump. Pressure cannot build up in chamber 64 on air flow alone to an extent sufficient to open valve 75. The air entering chamber 66 will pass out through the vent 95, whenever valve 99 at the base of chamber 66 is closed. When this valve opens some air will be drawn from chamber 66 by one of the pumps and forced back into chamber 64. On the first revolution of cam 26 the meter pistons 87 will be successively moved outwardly to the outer ends of their strokes and they will remain there until sufficient liquid pressure is available to move them inwardly. The meter pistons cannot therefore operate to create a partial vacuum in passage 83, port 70 and passage 68 such as to open valve 75. The outlet valve 75 will prevent air from passing from the primary separator chamber 64 into the metering cylinders 84. While one of the pump pistons will intermittently draw in some air from the secondary chamber 66 of the separator and expel it into the primary chamber 64 of the separator, the other three pump pistons will all be entirely effective for the work of rapidly effecting priming. The pump pistons 22 after expelling the air will draw in liquid and force it in the path described into entrance chamber 64' and through the coalescing roll 63 into the separator chamber 64, where it will settle to the bottom of the chamber and the air displaced thereby will be eliminated through the restricted outlet 67 into the secondary separator chamber 66, as above described in detail. As pumping continues, the chamber 64 becomes filled and then pressure is built up, due to the resistance afforded by restricted outlet 67, to open valve 75 and allow air-free liquid from the lower part of chamber 64 to be distributed through the rotary valve 77, successively through the several ports 70 and passages 83 to the metering cylinders 84. This will force the pistons 87 inwardly to make contact with the push rods 90 on the pump pistons, whereby the meter pistons 87 will then be reciprocated, causing air and liquid mixed to be expelled through the meter valve 77, into the discharge passage in tube 72, and then into the outlet passage 113, and the dispensing conduit 14 and 16. This action continues until the entire system is filled with liquid and all the air has been eliminated. Until the system is filled with liquid, the register 19 will not be driven because insufficient pressure will be available to engage the clutch elements 134 and 135. The apparatus is then fully primed and the nozzle valve can be closed and the motor 7 stopped. Closure of the nozzle valve will cause pressure to be built up in the dispensing conduit and such pressure will be transmitted through tube 167 to cylinder 166 causing piston 165 to shift the carrier 155 of the variable-speed driving mechanism into position to stop rotation of shaft 127, if the motor 7 is stopped after the nozzle valve is closed.

The normal condition of the apparatus is the fully primed condition thus described. The motor 7 will be stopped. Usually the operator will close the valve in the hose nozzle 17 before opening the switch of motor 7 and, when this is done, the hose 16, pipes 14, indicator 15 and passage 113 will be filled with liquid under a pressure which is greater than any which exists during a dispensing operation and which is sufficient to hold the variable-speed transmission in zero-speed position. All other liquid-conducting pipes and passages and all the cylinders will be completely filled with liquid. The primary separator chamber 64 will be substantially entirely filled. It can drain into chamber 66 only to the level of the bottom of the restricted outlet orifice 67. Atmospheric pressure will exist in the pump cylinders 20 and in the meter cylinders 84 and in the last-named liquid-conducting pipes and passages because they all connect with the separator chambers 64 and 66, which are vented to the atmosphere. The meter cylinders 84 are connected by valve 77 either through the inlet passage 68 and relief valve 128 to chamber 64 or through the discharge passage which is also vented to chamber 64 through relief valve 172. Thus, the pressure on opposite sides of the meter pistons 87 will be equal and no differential will exist tending to move the pistons. Expansion of liquid will not cause movement of either the meter or the pump pistons.

In the unusual case, where the motor 7 is stopped before the closing of the valve in nozzle 17, then the hose 16, pipe 14 and passage 113 will be filled with liquid under no substantial pressure and the variable-speed transmission may therefore be in full-speed position. However, pressure could build up in the pipe 14, hose 16 and passage 113, if expansion occurs, and cause the variable-speed transmission to be shifted to zero speed position.

In a normal dispensing operation, the motor 7 will be started first and the hose nozzle 17 then carried to, and inserted in, the fill opening of the tank to be serviced. This will result in shifting the transmission to neutral position, if it is not already so positioned. Opening of the nozzle valve will immediately decrease the pressure in the hose 16, pipe 14, passage 113 and cylinder 166, allowing spring 163 to shift the transmission to full speed position, thereby causing the pump pistons 22 and the meter pistons 87 to reciprocate in their respective cylinders. The pump pistons will force liquid into separator chamber 64 and immediately create pressure enough to open valve 75 and allow liquid to flow to the meter cylinders 84. The meter pistons 87 will discharge liquid through the tube 72, opening the check valve 117 and flowing into the discharge passage 113, pipe 14 and hose 16 into the tank to be serviced. The clutch elements 134 and 135 will be held engaged by the pressure in passage 113 and the register 19 will be driven synchronously with the meter pistons 87 to show the quantity and/or cost of the liquid dispensed. After the desired amount of liquid has been dispensed the valve in nozzle 17 is closed, thereby causing a rise of pressure in cylinder 166 and shifting of the variable speed transmission to zero-speed position. The operator then stops motor 7. The variable-speed transmission eliminates the necessity for the bypass valve usually employed to allow liquid to pass back around the pump when the pump motor is operated while the nozzle 17 is closed.

Should a leak develop, by which air enters the system, the air will mix with the liquid forming an emulsion. As the emulsion passes through the coalescing roll 63 the smaller air bubbles will be made into larger ones, which rise to the top of chamber 64 while the liquid settles to the bottom of the chamber, as described. The liquid and air emulsion near the top of the chamber will be expelled through the restricted orifice 67 into the secondary separator chamber 66, where separation will occur by gravity, the air being expelled through vent 95 and the liquid recovered intermittently by one of the pump cylinders as described. There will be a continuous loss of liquid from chamber 64 through orifice 67 but the pump cylinders 20 have a combined displacement area 50 per cent greater than that of the meter cylinders 84 (in this case because of the difference in diameter of the pump and meter cylinders, their strokes being the same except for the one meter cylinder that has the calibrating means). Therefore, there is ample pumping capacity to maintain the chamber 64 filled under pressure to maintain normal rate of delivery, say for example, 15 gallons per minute from the meter cylinders even though considerable air enters the system. The pressure may drop due to the leak and the rate of flow through the dispensing conduit decrease but the register will continue to be driven as long as the pressure is great enough to move the meter pistons. However, should air enter the system to such an extent as to cause the pumping means to lose its prime, valve 75 will close because of the lack of pressure in the chamber 64 and no liquid will be delivered into or from the meter cylinders. It requires from 4 to 5 p. s. i. to move the liquid through the metering cylinders so that these pistons will come to rest on a very bad leak before the clutch elements 134 and 135 will disengage. The pressure chamber 64 of the separator will be left nearly full to the level of the top of dam 55 and the metering cylinders will be left filled.

It will be clear that the displacement volume of the pump cylinders must be greater than that of the meter cylinders in order to insure that the meter cylinders will always be filled with liquid. Some of the pump displacement will be lost, when air is present in the liquid. Also, some of the pump displacement is lost because of the continuous outflow through the small outlet port 67 of the pressure chamber. Furthermore, one of the pump cylinders and its piston is continuously drawing fluid from the liquid recovery chamber 66. Therefore, the pump capacity must be enough greater than the meter capacity to take care of these losses.

Since the pump cylinders must have greater displacement volume than the meter cylinders, the smaller meter cylinders can be made smaller in diameter so that they can be telescoped in the outer ends of the pump cylinders, yielding the compact arrangement illustrated, wherein the one casing which houses both pump and meter elements is not much larger than that needed for either the pump or the meter alone according to prior practice. Also, by making the meter cylinders of smaller diameter than the pump cylinders, the necessary difference in displacement volume may be had, while maintaining the same stroke for both pump and meter pistons, thereby enabling the use of the simple but effective expedient of a push rod as a driving transmission between the pump and meter pistons, rendered operative only by pressure of the liquid greater than atmospheric in the pressure chamber of the separator.

The invention provides as one compact unit a pumping, metering and air separating means, eliminating the necessity for individual mountings and pipe connections between them and these several components are combined and arranged in a novel and improved manner for accurate measuring, efficient separation of air, speedy delivery and easy and convenient control.

What is claimed is:

1. Liquid measuring and dispensing apparatus, comprising, a pump having a suction conduit adapted for connection to a storage tank for liquid and a discharge conduit; an air and liquid separator including a pressure chamber having an inlet connected to said discharge conduit, a first outlet for liquid at a relatively low level, and a second outlet near its upper end relatively small as compared with the inlet and first outlet and connected to the atmosphere; a valve for the first outlet, yieldable means for holding said valve closed against the pressure due to the head of liquid in said chamber and yielding to allow the valve to open only when said chamber is filled with liquid under pressure greater than atmospheric, an inlet conduit connected to the first outlet, a dispensing conduit; a meter having a cylinder, a piston reciprocable in the cylinder, and a valve for connecting the cylinder first to said inlet conduit and then to the dispensing conduit; driving means for said pump and meter valve, and a driving transmission from the pump to the meter piston including parts held in driving engagement by the pressure of liquid admitted from said chamber through the meter valve on opening of said outlet valve, whereby the meter piston reciprocates only when said chamber is filled with liquid and is prevented from reciprocating during priming when said pump is pumping air.

2. Liquid dispensing apparatus, as claimed in claim 1, having a register, and a transmission between the register and said driving means including a clutch, and means responsive to the pressure in the dispensing conduit for engaging and disengaging the clutch accordingly as such pressure is above or below a predetermined value.

3. Liquid dispensing apparatus as claimed in claim 1, in which the dispensing conduit has at its outlet end a manually-operable valve and intermediate its ends a check valve, which opens to permit outflow and closes to prevent return flow, and the driving means has an actuating motor, and means responsive to the pressure in the dispensing conduit between the said outlet and check valves for disconnecting the motor and driving means, when the motor is operated while the manually-operable valve is closed.

4. A liquid dispensing apparatus, as claimed in claim 1, having spaced apart outlet and non-return valves in the dispensing conduit, a motor, a variable-speed transmission between the motor and said driving means, and means responsive to the pressure in the dispensing conduit between the valves therein for actuating said transmission to decrease the speed of the driving means progressively with the closing of the outlet valve and stop the driving means on closing of such valve.

5. Liquid measuring and dispensing apparatus comprising, a casing having a central chamber, a plurality of pump cylinders radiating from said chamber, a plurality of meter cylinders located one within the outer end of each pump cylinder in radially-spaced coaxial relation, a plurality of valve ports one for each meter cylinder, and a plurality of passages one for each meter cylinder and each connecting one end of a meter cylinder to a valve port; a piston reciprocable in each pump cylinder, a single acting piston reciprocable in each meter cylinder, a valve for the meter cooperating with said ports, driving means in the central chamber for reciprocating the pump pistons in their respective cylinders and for actuating said meter valve, each meter cylinder having an inner head with a coaxial opening therethrough, a projection from each pump piston extending through the opening in the head of the adjacent meter cylinder to abut one side of the piston therein, whereby to move it outwardly; air and liquid separating means including a pressure chamber having an inlet connected to the pump cylinders, a first outlet at a relatively low level, a second outlet near its upper end consisting of an orifice of restricted cross sectional area as compared to the inlet and first outlet, a discharge conduit leading from said meter valve, an inlet conduit leading from the first outlet to said meter valve, a valve controlling the first outlet, and yieldable means for holding the last-named valve closed until said pressure chamber is filled with liquid under a pressure greater than atmospheric and then yielding to allow the valve to open and admit liquid through said meter valve successively to the several ports and passages to the meter cylinders, whereby to move the meter pistons on their intake strokes and maintain them in contact with the projection on the adjacent pump piston.

6. Liquid dispensing apparatus, as claimed in claim 5, wherein each meter piston has a shock-absorbing abutment for engagement by its driving projection.

7. Liquid dispensing apparatus, as claimed in claim 5, having dash pots one for each meter piston, the relatively movable elements of each dash pot being connected one to the piston and the other to the cylinder to check outward movement of the piston.

8. Liquid dispensing apparatus, as claimed in claim 5, wherein each pump piston has a circular end portion and an annular rim portion turned outwardly from the end portion and movable on outward movement of the pump piston into the annular space between the meter and pump cylinders.

9. Liquid dispensing apparatus, as claimed in claim 5, wherein each pump cylinder has a valve-controlled inlet opening into the annular space between it and a meter cylinder, and the pump piston has a valve-controlled outlet passage therein opening into said central chamber, and the latter is connected to the inlet of said pressure chamber.

10. Liquid dispensing apparatus, as claimed in claim 5, wherein the separator has a second chamber connected to the second outlet of the pressure chamber and has a valve-controlled outlet connected to one of the pump cylinders.

11. Liquid dispensing apparatus, as claimed in claim 5, having a register, a transmission between the register and said driving means including a clutch, and means responsive to the pressure in the dispensing conduit for engaging and disengaging the clutch accordingly as such pressure is above or below a predetermined value.

12. Liquid dispensing apparatus, as claimed in claim 5, having a manually-operable valve on the outlet end of the dispensing conduit and a check valve intermediate the ends of the conduit opening to permit outflow and closing to prevent return flow, and said driving means including an actuating motor and means responsive to the pressure in the dispensing conduit between the said outlet and check valves for disconnecting the motor and driving means when the motor is operated while said manually-operable valve is closed.

13. Liquid dispensing apparatus, as claimed in claim 5, having spaced-apart outlet and non-return valves in the dispensing conduit, a motor, a variable-speed transmission between the motor and said driving means, and means responsive to the pressure in the dispensing conduit between the valves therein for actuating said transmission to decrease the speed of the driving means progressively with the closing of the manually-operable valve and to stop the driving means on closing of such valve.

14. Liquid dispensing apparatus, as claimed in claim 5, having spaced-apart outlet and non-return valves in the dispensing conduit, and relief-valve controlled by-pass means connecting the space in the dispensing conduit between the two valves therein to said vented chamber.

15. Liquid dispensing apparatus, as claimed in claim 5, having a relief-valve controlled by-pass around the valve controlling the outlet of the pressure chamber.

16. Liquid dispensing apparatus, as claimed in claim 5, wherein the separator has a second chamber connected to the second outlet of the pressure chamber, a standpipe upstanding in the second chamber, the upper end of said standpipe being closed and there being a narrow slot extending upwardly in the wall thereof, a conduit connecting the lower end of said standpipe to one of the pump cylinders, and a check valve in said conduit permitting fluid to pass to said last-named pump cylinder and preventing return flow.

17. Liquid dispensing apparatus, as claimed in claim 5, wherein the separator has a second chamber connected to the second outlet of the pressure chamber, a standpipe upstanding in the second chamber, a cap closing the upper end of the standpipe, a sleeve extending downwardly from the cap toward but terminating short of the lower end of the standpipe and encompassing the standpipe with its wall spaced from the wall of the standpipe, the wall of the standpipe having a narrow slot extending upwardly therein, a conduit connecting the lower end of said standpipe to one of the pump cylinders, and a check valve in said conduit permitting fluid to pass to said last-named pump cylinder and preventing return flow.

18. Liquid measuring and dispensing apparatus comprising, a casing having a central chamber, a plurality of pump cylinders radiating from said chamber, a plurality of meter cylinders located one within the outer end of each pump cylinder in radially-spaced coaxial relation, a plurality of valve ports one for each meter cylinder, and a plurality of passages one for each meter cylinder and each connecting one end of a meter cylinder to a valve port; said casing including a plurality of outer heads one closing the outer end of each meter cylinder and the outer end of the annular space between each meter and pump cylinder, a guide rod on each head projecting into the adjacent meter cylinder coaxially thereof, a piston reciprocable in each pump cylinder, a piston reciprocable in each meter cylinder and slidably supported on one of said guide rods, a valve for the meter cooperating with said ports, driving means in the central chamber for reciprocating the pump pistons in their respective cylinders and for actuating said meter valve, each meter cylinder having an inner head with a coaxial opening therethrough, a projection from each pump piston extending through the opening in the head of the adjacent meter cylinder to abut one side of the piston therein, whereby to move it outwardly; air and liquid separating means including a pressure chamber, having an inlet connected to the pump cylinders, a first outlet at a relatively low level, and a second outlet near the upper part thereof consisting of an orifice of restricted cross sectional area as compared to the inlet and first outlet; a discharge conduit leading from said meter valve, an inlet conduit leading from the first outlet to said meter valve, a valve controlling the first outlet, yieldable means holding the last-named valve closed until the pressure chamber is filled with liquid under a pressure greater than atmospheric and then yielding to allow the valve to open and admit liquid through said meter valve successively to the several ports and passages to the meter cylinders, whereby to move the meter pistons on their intake strokes and maintain them in contact with the projection on the adjacent pump piston, one of said projections being tubular and the adjacent guide rod being tubular and screw threaded; a rod manually rotatable from outside the cylinder, threaded into the screw threaded portion of said rod extending into said tubular portion and terminating with a flange adapted to be positioned for abutment by the adjacent meter piston to limit the inward stroke of the latter for calibration purposes.

19. Liquid measuring and dispensing apparatus comprising, a casing having a plurality of horizontal pump cylinders radiating from a central chamber and a plurality of meter cylinders located one within the outer end of each pump cylinder in radially-spaced coaxial relation, pump pistons and meter pistons respectively reciprocable in the pump and meter cylinders, a vertical driving shaft extending centrally through the central chamber and rotatably supported from the top and bottom walls thereof, a disk on top of said casing encompassing said shaft and having a circular series of ports therein, said casing having passages one connecting each port to a meter cylinder, a meter valve on said disk rotatable by said shaft and having inlet and outlet passages selectively connectible at one end to said ports, a second casing superposed on the first casing and having primary and secondary air and liquid separating chambers, the primary chamber having an inlet connected to the pump cylinders and an outlet orifice of restricted cross sectional area connecting its upper part to the secondary chamber, the secondary chamber having upper and lower outlets for air and separated liquid respectively, the second casing having an outlet conduit extending vertically through the primary chamber and having a liquid-tight connection with the outlet passage in said meter valve, the second casing having an annular outlet passage connecting a lower part of the primary chamber to the inlet passage of said meter valve, an outlet valve in said annular outlet passage, yieldable means holding the outlet valve closed under the weight of liquid in the primary chamber and yielding when the latter is filled with liquid under pressure to allow the outlet valve to open and enable liquid to pass to the meter cylinders, a push rod on each pump piston for engaging the adqacent meter piston and moving it outwardly, each meter piston being movable inwardly and held in abutment with the push rod by pressure of the liquid received from said primary chamber.

20. Liquid dispensing apparatus, as claimed in claim 19, having a hollow member capping the upper end of the conduit in the primary chamber and having an outlet, a dispensing conduit connected at one end to the last-named outlet, an outlet valve on the other end of the dispensing conduit, a check valve permitting flow only from said outlet conduit to the hollow member, a register-driving shaft extending from the meter valve through said outlet conduit check valve and hollow member, a clutch interposed in the last-named shaft, located in said hollow member and responsive to fluid pressure therein being closed by and only when a predetermined pressure exists within the hollow member.

No references cited.